(12) United States Patent
Klemme et al.

(10) Patent No.: US 11,754,711 B2
(45) Date of Patent: Sep. 12, 2023

(54) FREQUENCY CHIRP FOR LIDAR FOR HIGH-VELOCITY TARGETS

(71) Applicant: Seagate Technology LLC, Cupertino, CA (US)

(72) Inventors: Daniel J. Klemme, Shakopee, MN (US); Pierre Asselin, Richfield, MN (US); Zoran Jandric, St. Louis Park, MN (US)

(73) Assignee: LUMINAR TECHNOLOGIES, INC., Orlando, FL (US)

( * ) Notice: Subject to any disclaimer, the term of this patent is extended or adjusted under 35 U.S.C. 154(b) by 639 days.

(21) Appl. No.: 16/810,736

(22) Filed: Mar. 5, 2020

(65) Prior Publication Data

US 2021/0199803 A1 Jul. 1, 2021

Related U.S. Application Data

(60) Provisional application No. 62/955,598, filed on Dec. 31, 2019.

(51) Int. Cl.
*G01S 17/34* (2020.01)
*G01S 7/48* (2006.01)
*G01S 17/89* (2020.01)

(52) U.S. Cl.
CPC ............ *G01S 17/34* (2020.01); *G01S 7/4808* (2013.01); *G01S 17/89* (2013.01)

(58) Field of Classification Search
CPC ........ G01S 17/34; G01S 17/89; G01S 17/931; G01S 17/58; G01S 17/42; G01S 7/4808
See application file for complete search history.

(56) References Cited

U.S. PATENT DOCUMENTS

| | | | |
|---|---|---|---|
| 6,633,596 B1 | 10/2003 | Wulfmeyer et al. | |
| 7,986,397 B1 | 7/2011 | Tiemann et al. | |
| 9,335,415 B2 | 5/2016 | Jungwirth | |
| 10,036,801 B2* | 7/2018 | Retterath | G01S 7/4815 |
| 10,377,373 B2 | 8/2019 | Stettner et al. | |
| 2007/0171367 A1 | 7/2007 | Sebastian et al. | |
| 2007/0171407 A1* | 7/2007 | Cole | G01J 3/4338 356/300 |
| 2013/0021595 A1* | 1/2013 | Guetta | G01B 11/24 356/4.01 |
| 2014/0233942 A1* | 8/2014 | Kanter | G01S 7/4865 398/25 |

(Continued)

OTHER PUBLICATIONS

Morin et al., "What Narrow-linewidth Semiconductor Lasers Can Do for Defense and Security?," Proceedings of SPIE—The International Society for Optical Engineering, Apr. 2010.

*Primary Examiner* — John W Miller
*Assistant Examiner* — Sean N. Haiem
(74) *Attorney, Agent, or Firm* — Faegre Drinker Biddle & Reath LLP (57) ABSTRACT

A device includes a controller with a processor and memory with instructions for controlling power to a light source such that the light source emits a frequency-modulated continuous light beam that, over time, includes an up region, a down region, and a flat region. The up region includes increasing a frequency of the continuous light beam, the down region includes decreasing the frequency of the continuous light beam, and the flat region includes maintaining the frequency of the continuous light beam at a constant frequency.

20 Claims, 8 Drawing Sheets

(56) References Cited

U.S. PATENT DOCUMENTS

| | | | |
|---|---|---|---|
| 2016/0025843 A1* | 1/2016 | Sebastian | G01S 17/34 |
| | | | 356/4.01 |
| 2016/0377721 A1* | 12/2016 | Lardin | G01S 17/58 |
| | | | 356/5.09 |
| 2017/0350964 A1* | 12/2017 | Kaneda | G01S 17/26 |
| 2019/0004151 A1 | 1/2019 | Abediasl et al. | |
| 2019/0011558 A1* | 1/2019 | Crouch | G01S 7/4866 |
| 2019/0025426 A1* | 1/2019 | Satyan | G02B 27/48 |
| 2019/0025431 A1* | 1/2019 | Satyan | G01S 7/4914 |
| 2019/0033453 A1 | 1/2019 | Crouch et al. | |
| 2019/0154835 A1 | 5/2019 | Maleki et al. | |
| 2019/0257927 A1 | 8/2019 | Yao | |
| 2019/0310372 A1* | 10/2019 | Crouch | G01S 7/493 |
| 2020/0182978 A1* | 6/2020 | Maleki | G01S 17/42 |
| 2020/0333433 A1* | 10/2020 | Longman | G01S 13/931 |
| 2021/0109195 A1* | 4/2021 | Feng | G01S 3/788 |
| 2022/0413354 A1* | 12/2022 | Lukashchuk | G01S 7/4911 |

* cited by examiner

FREQUENCY CHIRP FOR LIDAR FOR HIGH-VELOCITY TARGETS

CROSS-REFERENCE TO RELATED APPLICATION

This application claims priority to U.S. Provisional Application No. 62/955,598, filed Dec. 31, 2019, which is herein incorporated by reference in its entirety.

SUMMARY

In certain embodiments, a method includes emitting a frequency-modulated continuous light beam that, over time, includes an up region, a down region, and a flat region. The up region includes increasing a frequency of the continuous light beam, the down region includes decreasing the frequency of the continuous light beam, and the flat region includes maintaining the frequency of the continuous light beam at a constant frequency. The method further includes detecting backscattered light, determining a magnitude based at least in part on the detected backscattered light responsive to the flat region, and determining, based at least in part on the determined magnitude, a velocity of a target.

In certain embodiments, a system includes a light source that is controlled to emit a frequency-modulated continuous light beam that, over time, includes an up region, a down region, and a flat region. The up region includes increasing a frequency of the continuous light beam, the down region includes decreasing the frequency of the continuous light beam, and the flat region includes maintaining the frequency of the continuous light beam at a constant frequency.

In certain embodiments, a device includes a controller with a processor and memory with instructions for controlling power to a light source such that the light source emits a frequency-modulated continuous light beam that, over time, includes an up region, a down region, and a flat region. The up region includes increasing a frequency of the continuous light beam, the down region includes decreasing the frequency of the continuous light beam, and the flat region includes maintaining the frequency of the continuous light beam at a constant frequency.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Frequency modulated continuous wave (FMCW) light detection and ranging (LIDAR) utilizes a continuous light beam with a frequency that changes over time. The light beam is emitted and then reflected from objects or targets and detected. However, when the light source and the detected objects are moving quickly with respect to each other, detection errors can occur. Certain embodiments of the present disclosure are accordingly directed to systems, methods, and devices for mitigating errors when detecting objects.

Figure 1:
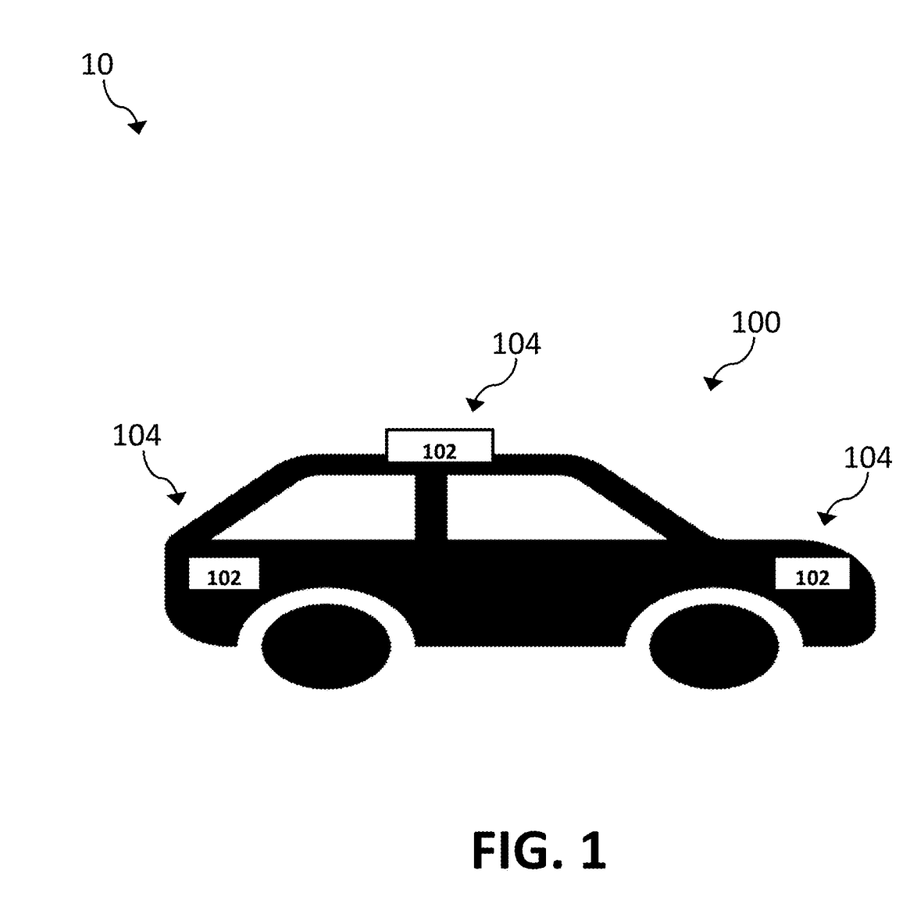
FIG. 1 shows a schematic of a system with a vehicle and LIDAR devices, in accordance with certain embodiments of the present disclosure.

FIG. 1 shows a schematic of a system 10 with a vehicle 100 such as an autonomous or semi-autonomous vehicle. The vehicle 100 includes sensors 102 (e.g., optical sensors such as photodetectors) positioned at various points around the vehicle 100. In certain embodiments, the sensors 102 are part of LIDAR (light detection and ranging) devices 104. LIDAR devices 104 transmit light from the vehicle 100 that may be reflected back from targets surrounding the vehicle 100. The reflected light is detected by the sensors 102, which in turn generate sensor signals indicative of the sensed reflected light. The sensor signals are used by the LIDAR device 104 (or separate data processing devices) to determine the velocity of the targets that reflected the light and the distance between those targets and the LIDAR device 104. Thus, the sensor signals are used to detect and determine various aspects of targets around the vehicle 100.

The vehicle 100 may include multiple LIDAR devices 104, each with one or more sensors 102. For example, the vehicle 100 may include LIDAR devices 104 that are arranged to help detect targets relatively near the vehicle 100 and other LIDAR devices 104 that are arranged to detect targets relatively far from the vehicle 100. In some embodiments, the sensors 102 may be physically separate from the LIDAR devices 104.

Figure 2:
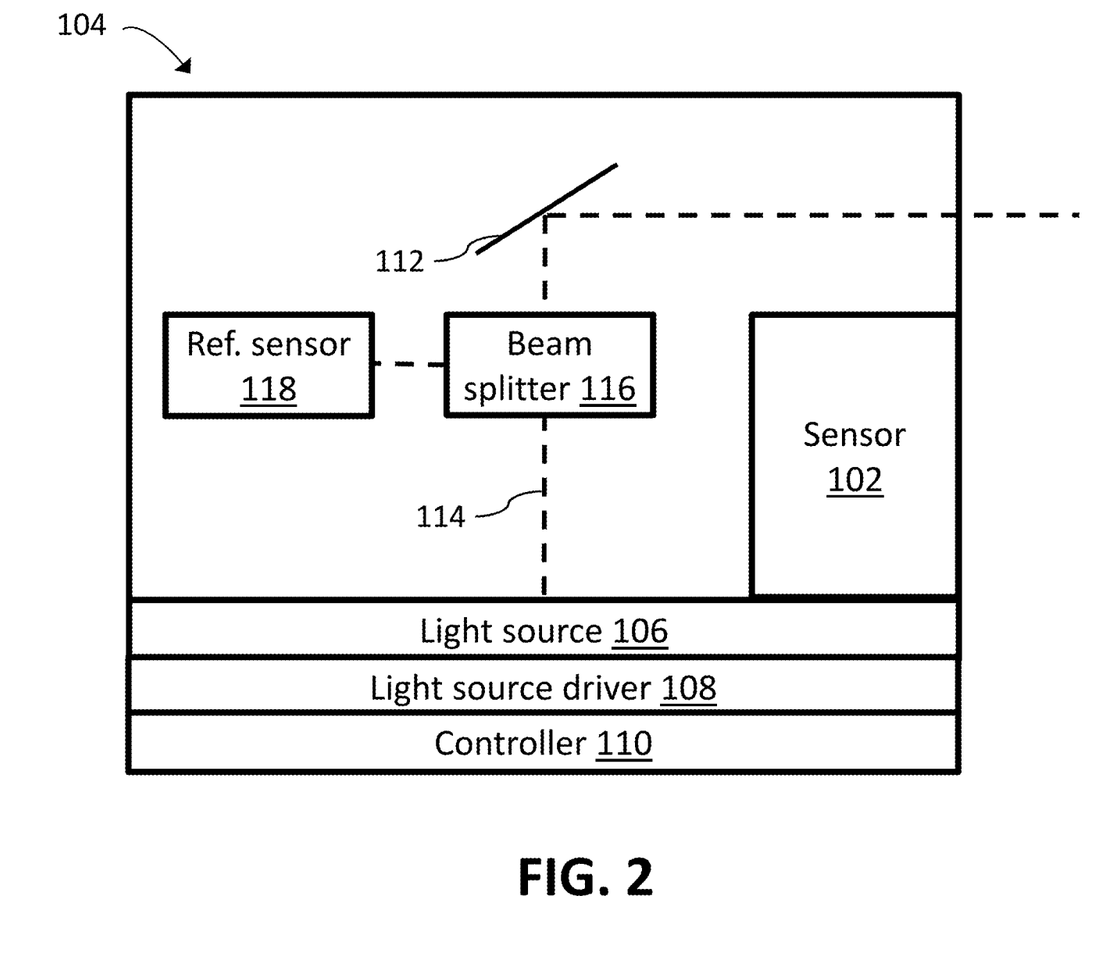
FIG. 2 shows a simplified schematic of a LIDAR device, in accordance with certain embodiments of the present disclosure.

FIG. 2 shows the LIDAR device 104 including the sensor 102, a light source 106, a light source driver 108, a controller 110, and a light steering device 112. The light source 106 is configured to emit a light beam (represented in FIG. 2 in dotted lines and by reference number 114). In certain embodiments, the light source 106 is a laser (e.g., a laser such as a VCSEL and the like) or a light-emitting diode. In certain embodiments, the emitted light 114 is coherent light. In certain embodiments, the light source 106 emits light within the infrared spectrum (e.g., 905 nm or 1550 nm frequencies) while in other embodiments the light source 106 emits light within the visible spectrum (e.g., a 485 nm frequency). As previously mentioned, for FMCW LIDAR, the emitted light 114 is a continuous light beam with a frequency that changes over time. In certain embodiments, the light steering device 112 is a mechanical device (e.g., rotating mirror) or a solid-state device (e.g., a mirror-on-a-chip). Although the above-described components are shown as being packaged all within the LIDAR device 104, components can be distributed among different devices or throughout the system 10.

The LIDAR device 104 may also include various other optical components. For example, the LIDAR device 104 may include light guides (e.g., waveguides, optical fibers) that direct the light emitted 114 from the light source 106 within the LIDAR device 104. In certain embodiments, the light emitted 114 from the light source 106 is split (e.g., via a beam splitter 116) such that a majority of the emitted light 114 (e.g., 90% or more) is directed outside the LIDAR device 104 towards targets, while a minority of the emitted light 114 (e.g., 10% or less) is directed towards a reference sensor 118. The reference sensor 118 can measure the emitted light 114 to determine a reference signal, which can be used to compare against backscattered light (described in more detail below).

Figure 3:
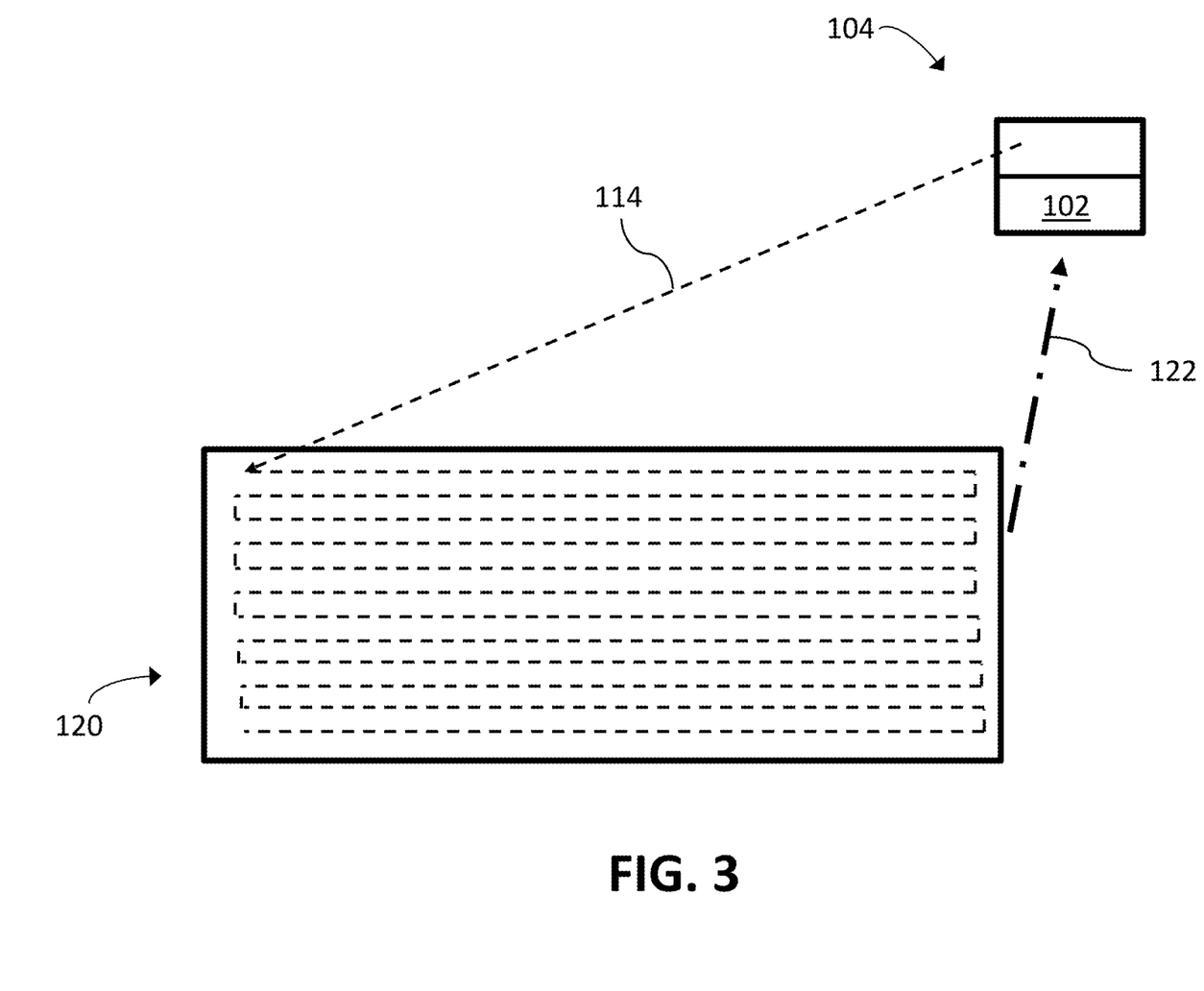
FIG. 3 shows the LIDAR device of FIG. 2 and an example light pattern generated by the LIDAR device, in accordance with certain embodiments of the present disclosure.

FIG. 3 shows an example light pattern 120 created over time when the emitted light 114 from the LIDAR device 104 is steered. In certain embodiments, the light pattern 120 is a raster-scan-like pattern. The emitted light 114 is transmitted out of the LIDAR device 104 towards objects. A portion of the emitted light 114 reflects off the objects and returns to the LIDAR device 104. This reflected light, referred to as backscattered light, is represented in FIG. 3 by a phantom line and reference number 122. The backscattered light 122 can be detected by the sensor 102, which can include one or more photodetectors/sensors. In response to receiving the backscattered light 122, the sensor 102 generates one or more sensing signals, which are ultimately used to detect the distance, velocity, and/or shapes of objects that reflect the emitted light 114 back to the sensor 102. In certain embodiments, the LIDAR device 104 includes one or more focusing devices such as lenses or parabolic mirrors that focus the backscattered light 122 towards the sensor 102.

Figure 4:
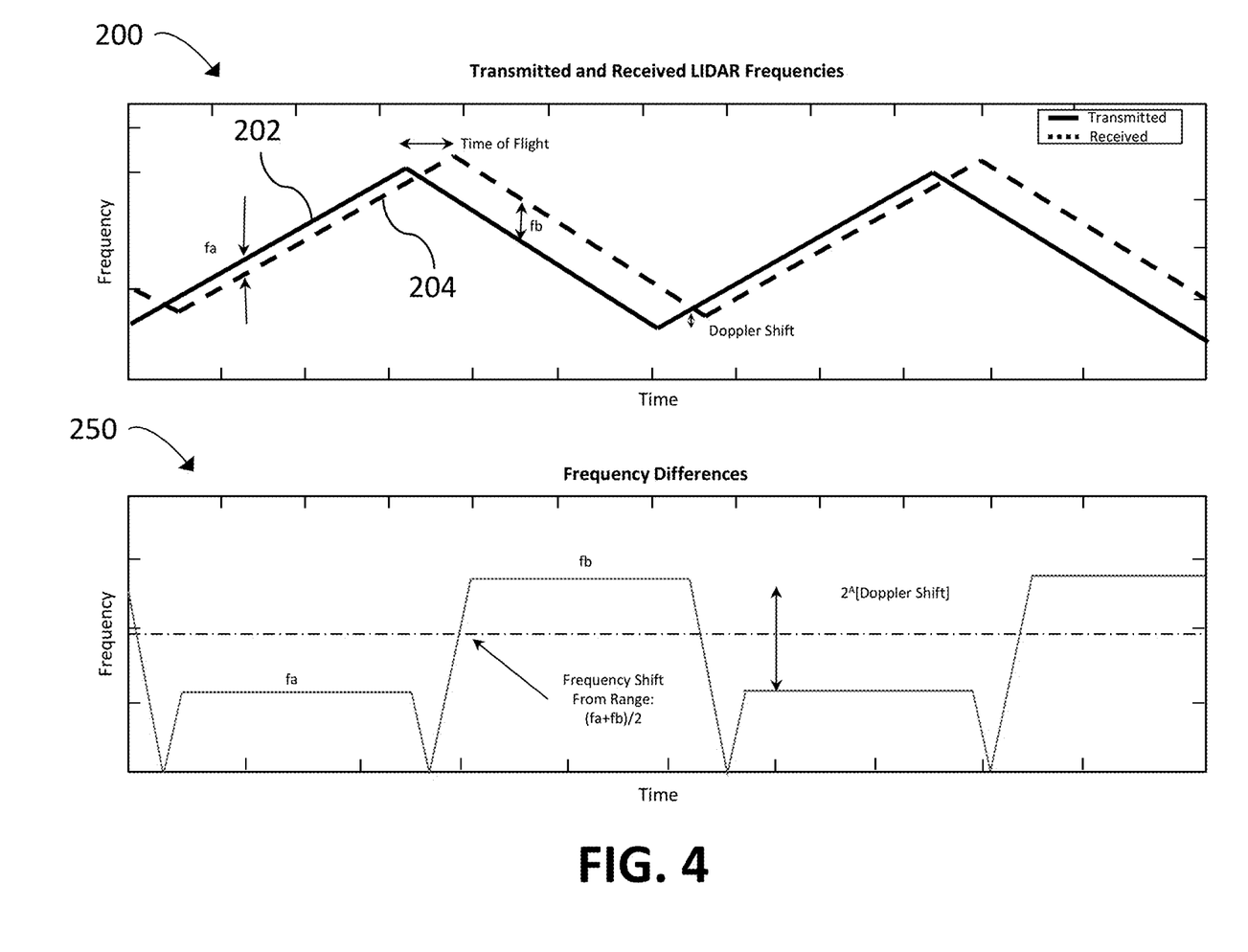
FIG. 4 shows a graph with plots of transmitted and received light signals, in accordance with certain embodiments of the present disclosure.

FIG. 4 shows a graph 200 with a plot 202 representing the frequency of the emitted light 114 over time. FMCW LIDAR modulates the frequency of the emitted light 114 that is directed towards objects. As shown in FIG. 4, the frequency of the emitted light 114 repeatedly increases and decreases linearly. Each pair of frequency increases and decreases is considered a "chirp," and each region within the chirp may be referred to as either an "up" region (e.g., the region with increasing frequency) or a "down" region (e.g., the region with decreasing frequency).

Plot 204 represents the frequency of the backscattered light 122 sensed by the sensor 102. The frequency of the backscattered light 122 is compared to a reference (e.g., the plot 202, which may be measured as the reference light of a local oscillator within the LIDAR device 104). Based on the comparison, the distance between the object and the sensor 102 of the LIDAR device 104 can be determined.

More specifically, in the graph 200 and in equations listed below, the difference between the reference and the backscattered light 122 response to the up regions are sometimes noted as "fa" (shown in graph 200) while the difference between the reference and the backscattered light 122 responsive to the down regions are sometimes noted as "fb" (also shown in graph 200). Using the equations listed below, the range frequency (represented by fRange below) and the Doppler frequency (represented by fDoppler below) can be calculated and then used to calculate the range (represented by "R" below) and the velocity (represented by "V" below) of the target that reflected the backscattered light.

$$f_{Range} = \frac{fa + fb}{2} \quad \text{Equation 1}$$

$$f_{Doppler} = \frac{fa - fb}{2} \quad \text{Equation 2}$$

$$R = \frac{c * f_{Range}}{2 * df/dt} \quad \text{Equation 3}$$

$$V = \frac{\lambda_0 * f_{Doppler}}{2} \quad \text{Equation 4}$$

If the target being detected is moving relative to the sensor 102 (e.g., the target has some velocity relative to the sensor 102), there will be a constant shift added to or subtracted from the frequency of the emitted light 114. This shift may be referred to as a Doppler shift. In addition, the magnitude of the Doppler shift is proportional to the velocity of the target, and this relationship can be used to measure the velocity of the target. These various parameters are shown graphically in annotated graph 250.

However, detection errors can occur when the LIDAR device 104 and the detected targets are moving quickly with respect to each other (e.g., other cars traveling along a highway). In short, when determining the range and velocity of the detected target, the LIDAR device 104 may calculate two valid solutions, only one of which is the correct solution. When fDoppler is greater than fRange (e.g., when the Doppler shift becomes larger than the range frequency), either fa or fb will decrease to 0 Hz—depending on the direction of the velocity. As fDoppler overwhelms fRange, the "negative" frequency will be measured as positive with a value of fDoppler minus fRange, while the other solution will have a value of fRange+fDoppler. Because the actual value of fRange and fDoppler are not known, the typical approach for calculating such values using only two frequency measurements will erroneously measure fDoppler as fRange and fRange as fDoppler.

Figure 5:
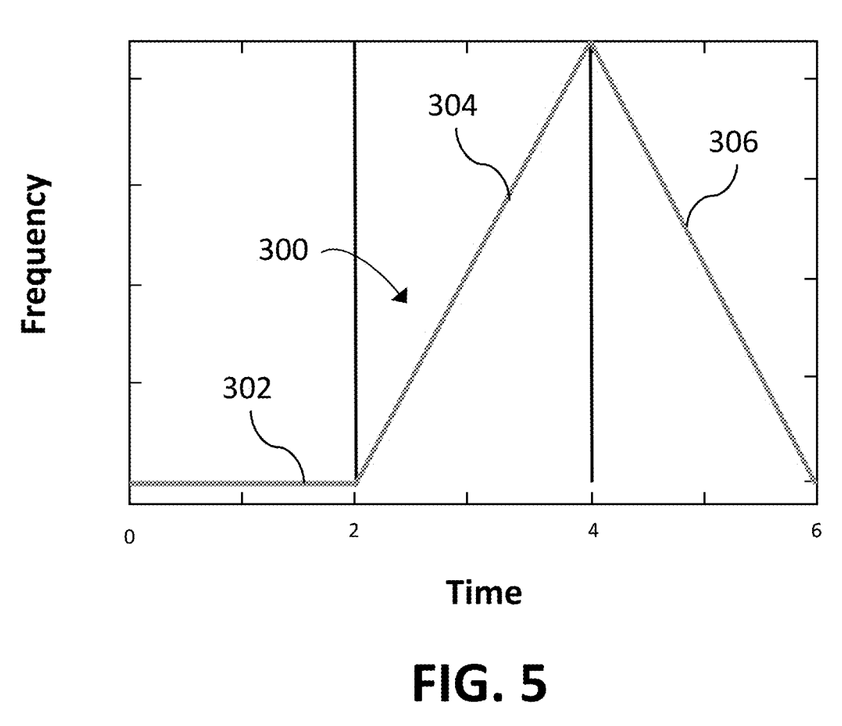
FIG. 5 shows a plot of a chirp signal, in accordance with certain embodiments of the present disclosure.

To help resolve the measurement ambiguity described above, the present disclosure features a modified chirp signal. FIG. 5 shows a plot 300 of a single chirp. The chirp includes three regions: a flat region 302 (or rest region) where frequency is held constant (e.g., a region with no frequency modulation), an up region 304 where frequency increases linearly, and a down region 306 where frequency decreases linearly. In practice, this modified chirp would be repeated along the scanning pattern of the emitted light 114 (e.g., repeated for each point along the scanning pattern). As such, the light source 106 of the LIDAR device 104 would be controlled to emit a frequency-modulated continuous light beam that, over time, includes the flat region 302, the up region 304, and the down region 306 repeated over and over. To control the light source 106, the controller 110 may include memory and a processor with instructions for controlling the power to the light source driver 108 (and ultimately to the light source 106) to maintain (e.g., the flat region 302) and then modulate (e.g., the up region 304 and the down region 306) the frequency of the emitted light 114 of the light source 106.

When the backscattered light 122 is detected from the modified chirp signal, the backscattered light 122 responsive to the flat region 302 is used to measure fDoppler (e.g., the Doppler shift) directly rather than by calculating fDoppler from Equation 2 listed above. Put another way, the backscattered light 122 responsive to the flat region 302 of the modified chirp signal will not experience frequency modulation, so the magnitude of fDoppler can be measured directly.

The backscattered light 122 responsive to the rest of the modified chirp signal (e.g., the up region 304 and the down region 306) can be used similarly to an unmodified chirp signal. As such, the measured magnitude of fDoppler and the measured fa and fb can be used to determine whether fRange is less than or greater than fDoppler and the correct range and velocity can be calculated. Put another way, with the addition of the measured magnitude of fDoppler, the LIDAR device 104 can disambiguate between the two possible solutions described above. As such, the LIDAR device 104 can correctly calculate the velocity and range of a target when fDoppler is less than or greater than fRange.

One thing to note is that modifying the chirp signal to include the flat region 302 has potential drawbacks of having less time to make each measurement compared to a triangle wave and/or needing to increase the time used for each point along the scanning pattern. This may decrease the frame rate of the LIDAR device 104 and/or may lower the maximum detectable range of the LIDAR device 104.

In certain embodiments, each of the three regions of the modified chirp signal (e.g., the flat region 302, the up region 304, and the down region 306) lasts the same amount of time such that each region consumes one-third of the total time of the modified chirp. In other embodiments, the flat region 302 is shorter than the up region 304 and the down region 306. In such embodiments, the time consumed by the flat region 302 is decreased so that more time of the modified chirp signal can be used by the up region 304 and the down region 306. For example, the duration of the flat region 302 dictates the frequency able to be detected for fDoppler. Specifically, only the frequencies above 2 divided by the duration (i.e., 2/duration) can be detected. As such, the duration can be tuned to only detect targets traveling above a threshold velocity while optimizing the time to be consumed by the up region 304 and the down region 306.

In certain embodiments, the total period of time for a single modified chirp is on the order of 6-12 microseconds. As such, in embodiments where the flat region 302 consumes a smaller amount of time than the other regions, the flat region 302 may last 2 microseconds or less. Also, in certain embodiments, the frequency range of the up region 304 and the down region 306 can be on the order of gigahertz (e.g., 5-15 GHz, 10 GHz).

Figure 6:
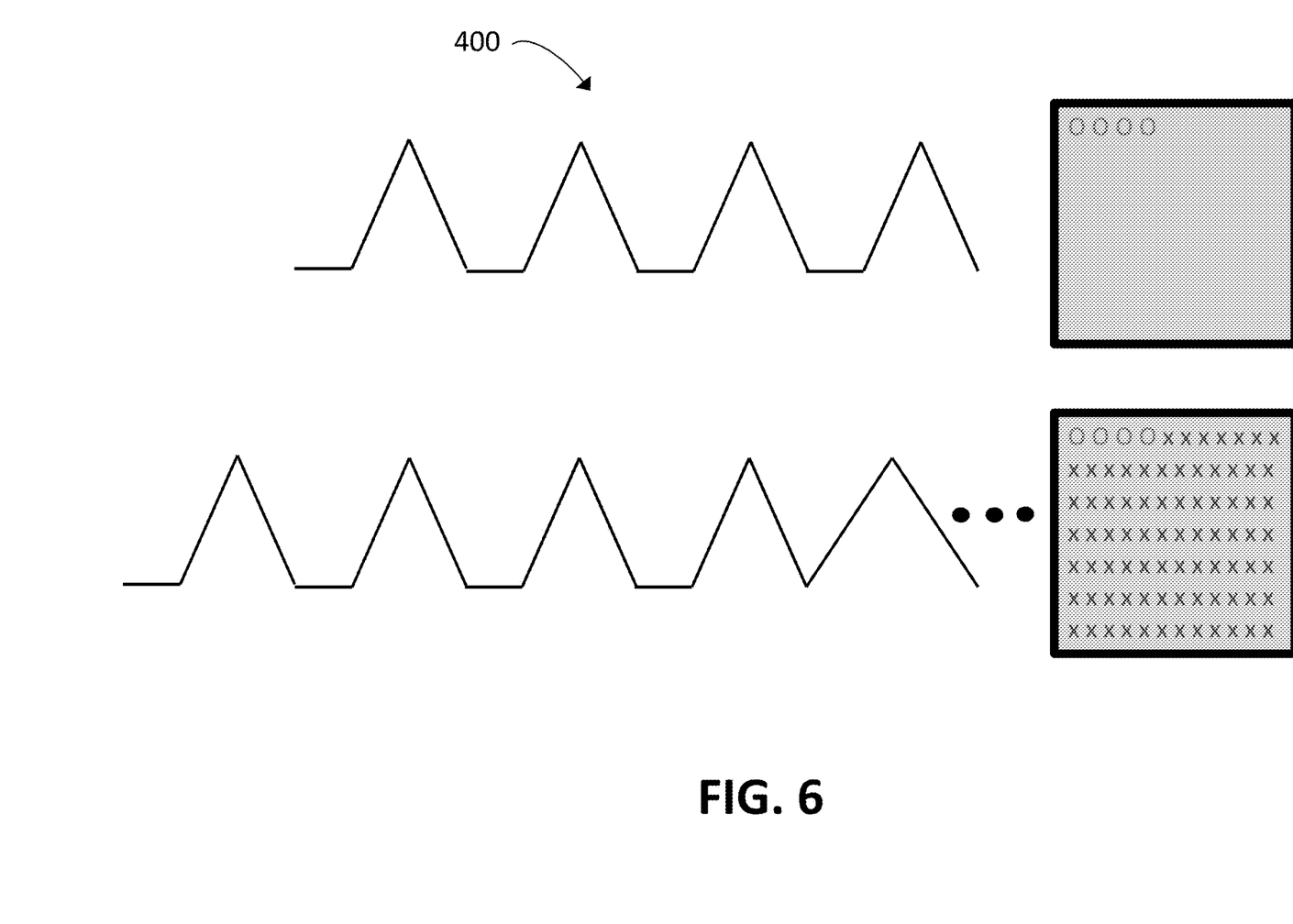
FIG. 6 shows schematics of alternative chirp signals, in accordance with certain embodiments of the present disclosure.

FIG. 6 shows schematics of another approach for using a modified chirp signal with the LIDAR device 104. In certain embodiments, the LIDAR device 104 can use the modified chirp signal described above for a first set of points along a scanning pattern. The upper portion of FIG. 6 shows as a non-limiting example four points (represented by "O"s) and four cycles of a modified chirp 400.

In certain embodiments, once the LIDAR device 104 detects a given target (e.g., a previously detected target), the LIDAR device 104 could then use a chirp signal without a flat region or by decreasing the period of time consumed by the flat region of the modified chirp signal. In certain embodiments, the LIDAR device 104 uses the modified chirp signal a few times per frame of a detected target while an unmodified chirp signal is used for the rest of the frame. As such, the modified chirp signal can be used to detect high velocity targets but such use is limited so that the impact on the frame rate of the LIDAR device 104 is reduced. In certain embodiments, the target is detected using a trained object-recognition algorithm (e.g., a training artificial intelligence algorithm/module).

Figure 7:
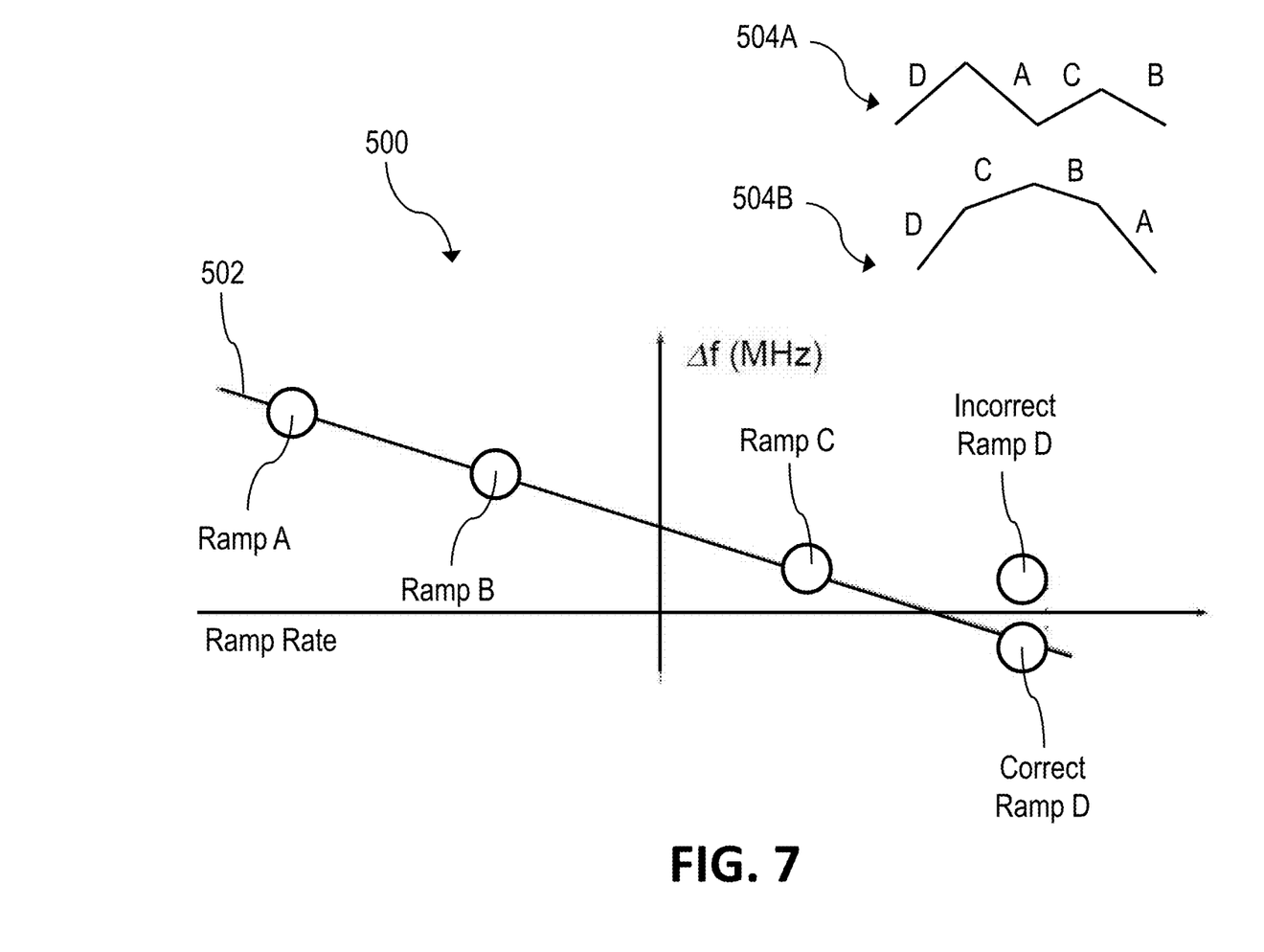
FIG. 7 shows a graph with a plot of frequency differences against ramp rates, in accordance with certain embodiments of the present disclosure.

FIG. 7 outlines another approach for using the modified chirp signal to disambiguate between the two possible solutions described above. FIG. 7 shows a graph 500 with a plot 502 of frequency differences (Y-axis) against ramp rates (X-axis). The frequency differences are the differences between the reference signal and the backscattered light 122 response to frequency "ramps" such as "fa" and "fb" noted above.

FIG. 7 also shows two different approaches for modified chirp signals 504A and 504B with four frequency ramps (i.e., a down region labeled as Ramp A, another down region labeled as Ramp B, an up region labeled as Ramp C, and another up region labeled as Ramp D) that correspond to the frequency ramps shown along the plot 502. As can be seen when comparing the two modified chirp signals, the ramps can be arranged in different orders. Further, the ramps can each have different slopes. For example, in both modified chirp signals 504A and 504B, Ramp A has a larger negative slope than Ramp B, and Ramp D has a larger positive slope than Ramp C. These modified chirp signals 504A and 504B does not include a flat region. Further, although the graph 500 shows four points long the plot 502 (i.e., Ramp A, Ramp B, Ramp C, and Ramp D), as few as three points can be used for the approach described herein.

Using the approach outlined in FIG. 7, the frequency difference for at least three frequency ramps is calculated and plotted against the ramp rate along a negative linear slope (which represents the range in meters). Where ambiguity exists, two frequency difference solutions are possible. In FIG. 7, Ramp D shows mirrored solutions, with one calculated frequency difference being positive and the other negative. The correct calculated frequency difference will fall along the calculated slope (e.g., the plot 502). As such, the calculated frequency difference that does not fall along the calculated slope can be ignored.

Figure 8:
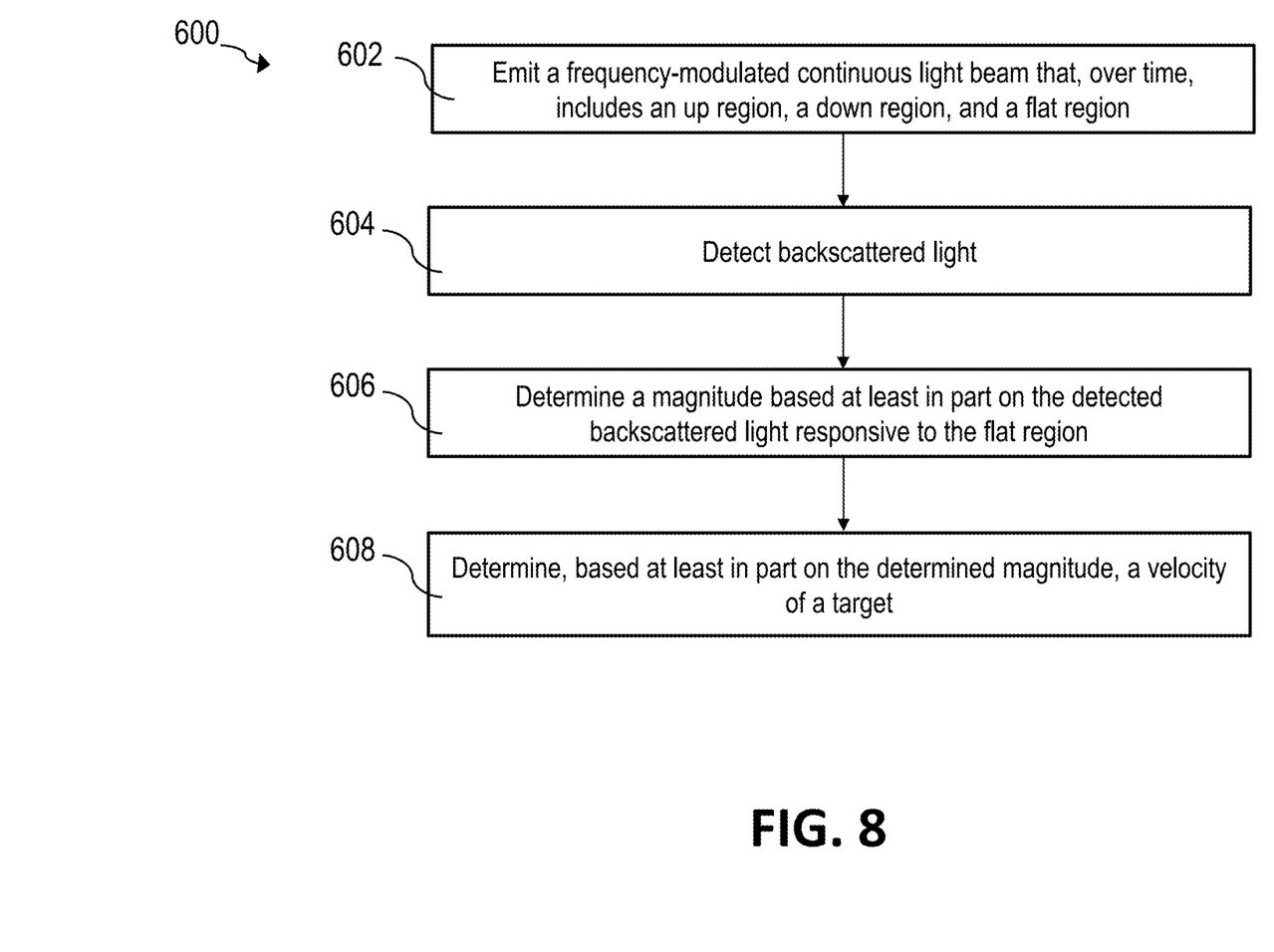
FIG. 8 shows a block diagram of steps for determining a velocity of a target, in accordance with certain embodiments of the present disclosure.

FIG. 8 outlines steps of a method 600 for using the LIDAR device 104. The method 600 includes emitting a frequency-modulated continuous light beam that, over time, includes an up region, a down region, and a flat region (block 602 in FIG. 8). The up region includes increasing a frequency of the continuous light beam, the down region includes decreasing the frequency of the continuous light beam, and the flat region includes maintaining the frequency of the continuous light beam at a constant frequency. The method 600 further includes detecting backscattered light (block 604 in FIG. 8), determining a magnitude based at least in part on the detected backscattered light responsive to the flat region (block 606 in FIG. 8), and determining, based at least in part on the determined magnitude, a velocity of a target (block 608 in FIG. 8).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method comprising:
   emitting a frequency-modulated continuous light beam that, over time, includes an up region, a down region, and a flat region, wherein the up region includes increasing a frequency of the continuous light beam, the down region includes decreasing the frequency of the continuous light beam, and the flat region includes maintaining the frequency of the continuous light beam at a constant frequency;
detecting backscattered light;
determining a magnitude of a Doppler frequency shift based only on the detected backscattered light responsive to the flat region and not based on the detected backscattered light responsive to the up region and the down region; and
determining, based at least in part on the determined magnitude of the Doppler frequency shift, a velocity of a target.

2. The method of claim 1, wherein the frequency during the up region increases linearly, wherein the frequency during the down region decreases linearly.

3. The method of claim 1, wherein the up region lasts for a first period of time, the down region lasts for a second period of time, and the flat region lasts for a third period of time, wherein the third period of time is equal to or shorter than either of the first period of time or the second period of time.

4. The method of claim 1, wherein the up region lasts for a first period of time, the down region lasts for a second period of time, and the flat region lasts for a third period of time, further comprising:
changing the length of the third period of time in response to detecting an event.

5. The method of claim 4, wherein the event is recognizing the target.

6. The method of claim 1, wherein the up region, the down region, and the flat region are repeated over time.

7. The method of claim 1, wherein the up region, the down region, and the flat region create a first cycle, wherein a second cycle comprises a longer up region and a longer down region, further comprising:
emitting the frequency-modulated continuous light beam according to the first cycle; and
emitting the frequency-modulated continuous light beam according to the second cycle in response to recognizing the target.

8. The method of claim 1, further comprising:
determining a slope of calculated frequency differences plotted along ramp rate; and
determining that at least one of the calculated frequency differences falls along the determined slope;
determining that another of the calculated frequency differences does not fall along the determined slope; and
determining, based only on the calculated frequency differences that fall along the determined slope, the velocity of the target.

9. A system comprising:
a light source controlled to emit a frequency-modulated continuous light beam that, over time, includes an up region, a down region, and a flat region, wherein the up region includes increasing a frequency of the continuous light beam, the down region includes decreasing the frequency of the continuous light beam, and the flat region includes maintaining the frequency of the continuous light beam at a constant frequency;
an optical detector arranged to detect backscattered light response to the up region, the down region, and the flat region; and
circuitry configured to:
determine a magnitude of a Doppler frequency shift based only on the detected backscattered light responsive to the flat region and not based on the detected backscattered light responsive to the up region and the down region,
determine that the magnitude of the Doppler frequency shift is greater than or less than a range frequency shift, and
determine a velocity of a target, based at least in part on the determined magnitude and that the magnitude is greater than or less than the range frequency shift.

10. The system of claim 9, wherein the light source and the optical detector are packaged in a shared housing.

11. The system of claim 9, further comprising:
a light steering device arranged to steer the continuous light beam along a pattern.

12. The system of claim 11, wherein the light steering device is a mechanical device or solid-state device.

13. The system of claim 9, further comprising:
a light source driver coupled to the light source and configured to apply a power signal to modulate the frequency of the emitted light of the light source.

14. A device comprising:
a controller including a processor and memory with instructions for controlling power to a light source such that the light source emits a frequency-modulated continuous light beam that, over time, includes an up region, a down region, and a flat region, wherein the up region includes increasing a frequency of the continuous light beam, the down region includes decreasing the frequency of the continuous light beam, and the flat region includes maintaining the frequency of the continuous light beam at a constant frequency,
wherein the memory of the controller further stores instructions for:
determining, based only on backscattered light responsive to the flat region and not based on the detected backscattered light responsive to the up region and the down region, that a Doppler frequency shift is greater than or less than a range frequency shift, and
determining a velocity of a target, based at least in part on whether the Doppler frequency shift is determined to be greater than or less than the range frequency shift.

15. The device of claim 14, further comprising:
a light source driver operably coupled to the controller and the light source for providing power to the light source.

16. The device of claim 15, further comprising:
the light source operably coupled to the light source driver and the controller.

17. The system of claim 9, wherein a frequency range of the up region and the down region is 5-15 gigahertz.

18. The system of claim 17, wherein the flat region lasts for 2 microseconds.

19. The system of claim 9, wherein a length of time for the flat region is modified in response to detecting an event.

20. The method of claim 1, further comprising:
determining that the magnitude of the Doppler frequency shift is greater than or less than a range frequency shift; and
determining the velocity of the target based further on the determining that the magnitude is greater than or less than the range frequency shift.

* * * * *